US012531337B2

(12) United States Patent
Sundararajan et al.

(10) Patent No.: US 12,531,337 B2
(45) Date of Patent: Jan. 20, 2026

(54) MASSIVE MIMO BEAMFORMING ANTENNA WITH IMPROVED GAIN

(71) Applicant: John Mezzalingua Associates, LLC, Liverpool, NY (US)

(72) Inventors: Niranjan Sundararajan, Clay, NY (US); Taehee Jang, Allen, TX (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 202 days.

(21) Appl. No.: 18/140,963

(22) Filed: Apr. 28, 2023

(65) Prior Publication Data

US 2023/0352831 A1 Nov. 2, 2023

Related U.S. Application Data

(60) Provisional application No. 63/336,970, filed on Apr. 29, 2022.

(51) Int. Cl.
*H01Q 3/36* (2006.01)
*H01Q 3/26* (2006.01)

(52) U.S. Cl.
CPC ............. *H01Q 3/36* (2013.01); *H01Q 3/2694* (2013.01)

(58) Field of Classification Search
CPC .... H01Q 21/28; H01Q 21/0006; H01Q 21/24; H01Q 3/36; H01Q 3/2694
See application file for complete search history.

(56) References Cited

U.S. PATENT DOCUMENTS 9,293,809 B2 3/2016 Teillet et al.
10,958,316 B2 3/2021 Bisiules et al.
(Continued)

FOREIGN PATENT DOCUMENTS

CN 117044128 A * 11/2023 ............. H01Q 15/24
EP 4207626 A2 * 7/2023 ............. H01Q 1/246
(Continued)

OTHER PUBLICATIONS

International Preliminary Report on Patentability and Written Opinion in connection to PCT/US2023/020387, dated Nov. 7, 2024.
(Continued)

*Primary Examiner* — Seokjin Kim
(74) *Attorney, Agent, or Firm* — Meunier Carlin & Curfman LLC

(57) ABSTRACT

An 8T8R antenna has a plurality of columns of antenna elements whereby a subset of the columns are combined into a plurality of composite columns. In an example, the antenna has six columns of antenna elements whereby the two columns at either end of the array are combined into a composite column. The antenna ports corresponding to the two outer composite columns are coupled to a splitter/combiner that has a power divider and a delay line to provide phase compensation. The antenna also has a phase compensator that provides for phase compensation between the outputs of the splitter/combiners and the antenna ports corresponding to the inner columns that are not combined into composite columns. In a variation, the columns of antenna elements are combined into a plurality of composite columns, each having a pair of columns, whereby the number of columns is twice the number of composite columns.

11 Claims, 5 Drawing Sheets

(56) References Cited

U.S. PATENT DOCUMENTS

| | | | | |
|---|---|---|---|---|
| 11,205,852 | B2 | 12/2021 | Wu et al. | |
| 11,211,719 | B2 * | 12/2021 | Petersson | H04B 7/0617 |
| 11,515,622 | B2 | 11/2022 | Hou et al. | |
| 11,569,575 | B2 * | 1/2023 | Klemmer | H04B 7/0617 |
| 11,611,143 | B2 | 3/2023 | Hou et al. | |
| 11,621,755 | B2 | 4/2023 | Wu et al. | |
| 11,664,600 | B2 | 5/2023 | Wu et al. | |
| 2002/0146994 | A1 | 10/2002 | Marrah et al. | |
| 2016/0127012 | A1 | 5/2016 | Shylendra et al. | |
| 2019/0310358 | A1 * | 10/2019 | Lee | G01S 13/931 |
| 2019/0319684 | A1 * | 10/2019 | Athley | H01Q 21/0025 |
| 2020/0358182 | A1 * | 11/2020 | Klemmer | H01Q 3/26 |
| 2021/0391655 | A1 | 12/2021 | Brobston et al. | |
| 2022/0131578 | A1 * | 4/2022 | Junttila | H01Q 21/24 |
| 2023/0082093 | A1 | 3/2023 | Pollayi et al. | |
| 2023/0170957 | A1 | 6/2023 | Zimmerman et al. | |
| 2023/0291128 | A1 * | 9/2023 | Hojjat | H01Q 1/246 |
| 2024/0178558 | A1 * | 5/2024 | Hung | H01Q 3/267 |

FOREIGN PATENT DOCUMENTS

| | | | | |
|---|---|---|---|---|
| KR | 102167084 | B1 * | 10/2020 | H01Q 21/06 |
| WO | WO-2024212123 | A1 * | 10/2024 | H01Q 1/246 |

OTHER PUBLICATIONS

International Search Report and Written Opinion for International Application No. PCT/US2023/020387 dated Aug. 22, 2023.

* cited by examiner

MASSIVE MIMO BEAMFORMING ANTENNA WITH IMPROVED GAIN

CROSS REFERENCE TO RELATED APPLICATIONS

This application is a non-provisional of and claim priority benefit of U.S. Provisional Patent Application Ser. No. 63/336,970, filed Apr. 29, 2022, which application is hereby incorporated by this reference in its entirety as if fully set forth herein.

BACKGROUND OF THE INVENTION

Field of the Invention

The present invention relates to wireless communications, and more particularly, to beamforming antennas.

Related Art

Recent developments in Massive MIMO (Multiple Input Multiple Output) cellular antenna systems involve 8T8R (Eight Transmit Eight Receive) and 64T64R (64 Transmit 64 Receive) concepts in which C-band radiators are arranged in columns, each of which are fed the same signal with differential amplitude and phase weights to provide horizontal beamforming. In the case of 8T8R, the antenna has four columns of antenna elements whereby each antenna element has two dipoles in orthogonal polarization (e.g., +/−45 degrees). Each of the four columns may have twelve antenna elements, which may further be provided different amplitude and phase weights to provide beam tilting along the vertical axis, using a phase shifter (not shown) that is integrated into the antenna. The name 8T8R refers to the fact that eight ports (four per polarization) may be used for both transmission and reception in a TDD (Time-Division Duplex) arrangement. The use of TDD offers the advantage of reciprocity, whereby the antenna's gain pattern is identical for transmission and reception, and the same physical channels over the air interface may be used for both.

Further to 8T8R, for each polarization, a single signal may be applied to each corresponding four ports, with amplitude and phase weights applied to each port (and corresponding column) to implement beamforming in the azimuth plane for both transmission and reception. Accordingly, an 8T8R antenna may support four MIMO layers per polarization.

FIG. 1 illustrates a conventional 8T8R array 100, which has a plurality of antenna elements 105 arranged in columns 110*a*, 110*b*, 110*c*, 110*d*. Each antenna element 105 has a +45 dipole and a −45 dipole, and thus are fed two independent RF (Radio Frequency) signals. Column 110*a* is fed a +45 signal via port 115*a* and a −45 signal via port 120*a*; column 110*b* is fed +45 signal via port 115*b* and a −45 signal via port 120*b*; column 110*c* is fed +45 signal via port 115*c* and a −45 signal via port 120*c*; and column 110*d* is fed +45 signal via port 115*d* and a −45 signal via port 120*d*. Conventional 8T8R array 100 implements beamforming with the +45 polarization signal by having a single RF signal provided to ports 115*a*/115*b*/115*c*/115*d*, each having complex weights applied to it in a remote radio unit (not shown) to steer its beam in the azimuth plane. The same is true for the −45 polarization signal via ports corresponding to RF signals 120*a*/120*b*/120*c*/120*d*.

64T64R is an expansion of 8T8R, but with the antenna elements (each having dipoles of two orthogonal polarizations) with a total of 128 antenna elements. It may support up to 16 MIMO layers per polarization. An advantage of 64T64R is that it may provide for improved beamforming gain by forming a tighter beam, thus being able to differentiate more UEs by beam. This is due to the fact that there are more columns of antenna elements, creating a greater array factor with finer resolution. For example, 8T8R typically as 20-21 dBi of gain, and 64T64R typically has 23-24 dBi.

However, both the 8T8R antenna and the 64T64R antenna have distinct disadvantages. The former may have insufficient gain and an insufficiently narrow beamwidth to implement effective Massive MIMO. The latter, although it provides better performance, it has a severe disadvantage in that it requires a much greater number of power amplifiers, low noise amplifiers, and associated infrastructure that can make the deployment of a 64T64R antenna prohibitively complex.

Accordingly what is needed is a Massive MIMO antenna that offers greater performance than 8T8R without incurring 64T64R's problems of complexity and mass.

SUMMARY OF THE DISCLOSURE

An aspect of the present disclosure involves an antenna. The antenna comprises a plurality of columns of antenna elements, wherein a subset of the columns of antenna elements are combined into one or more composite columns; a plurality of ports, each of the plurality of ports corresponding to one of a column and a composite column in the plurality of columns; one or more splitter/combiners, each of the splitter/combiners being coupled to one of the composite columns; and a phase compensator coupled to an output of each of the one or more splitter/combiners and to each of the remaining ports that do not correspond to a composite column.

Another aspect of the present disclosure involves and antenna. The antenna comprises a plurality of composite columns of antenna elements, wherein each of the composite columns of antenna elements has a plurality of constituent columns of antenna elements; a plurality of splitter/combiners, each corresponding to a composite column and coupled to the constituent columns of the corresponding composite column; and a phase compensator that is coupled to an output of each of the splitter/combiners and to each of the composite columns.

Another aspect of the present disclosure involves an antenna array having a plurality of composite columns of antenna elements, wherein each of the composite columns of antenna elements comprises a first constituent column and a second constituent column. The first constituent column comprises a top segment having a first number of antenna elements in a first sub-column position; one or more intermediate segments having a second number of antenna elements wherein the one or more intermediate segments are disposed in an alternating first and second sub-column positions; and a bottom segment having a third number antenna elements in the first sub-column position.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate (one) several embodiment(s) of the invention and together with the description, serve to explain the principles of the invention.

DESCRIPTION OF EXEMPLARY EMBODIMENTS

Figure 1:
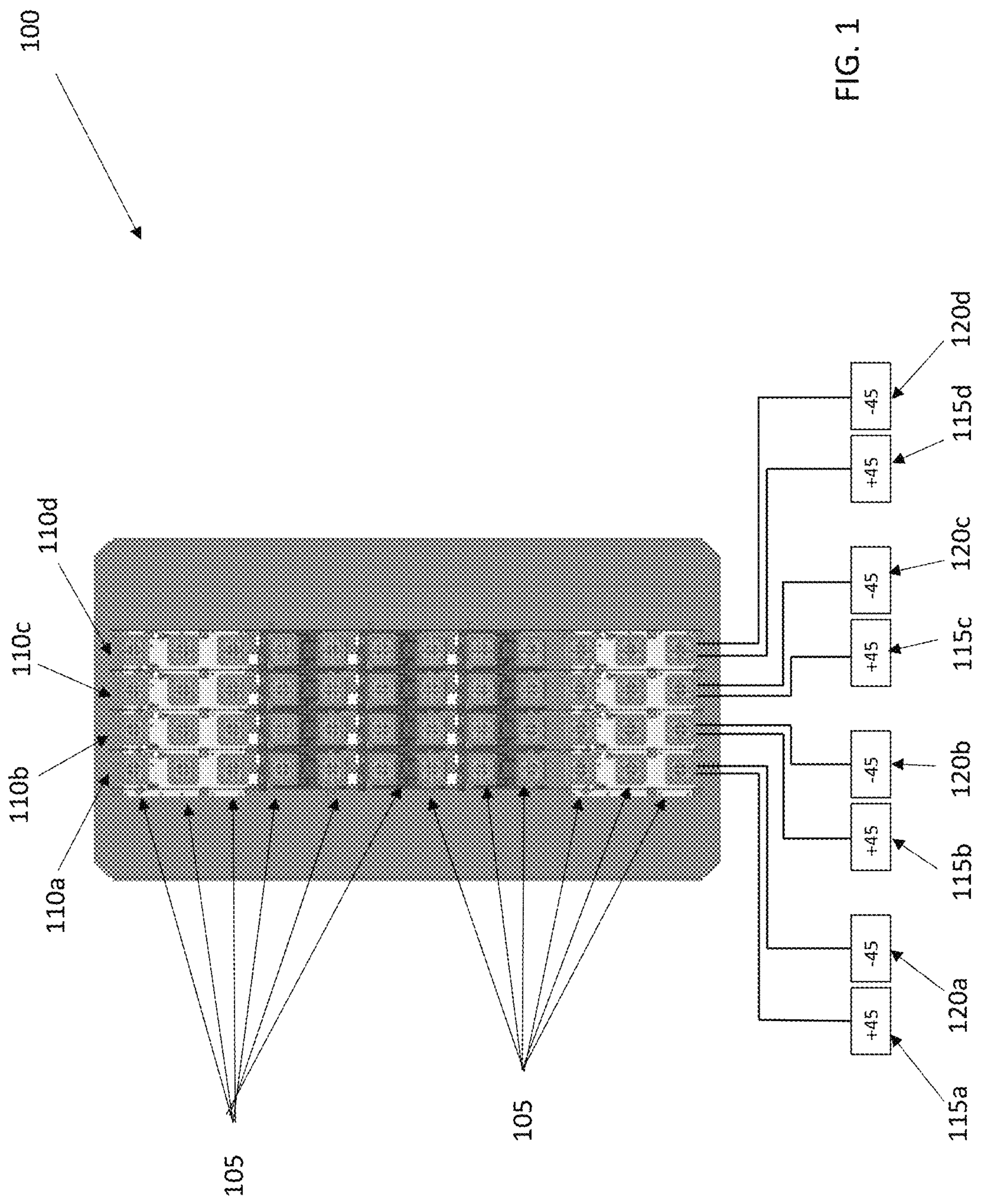
FIG. 1 illustrates a conventional 8T8R array.
Figure 2:
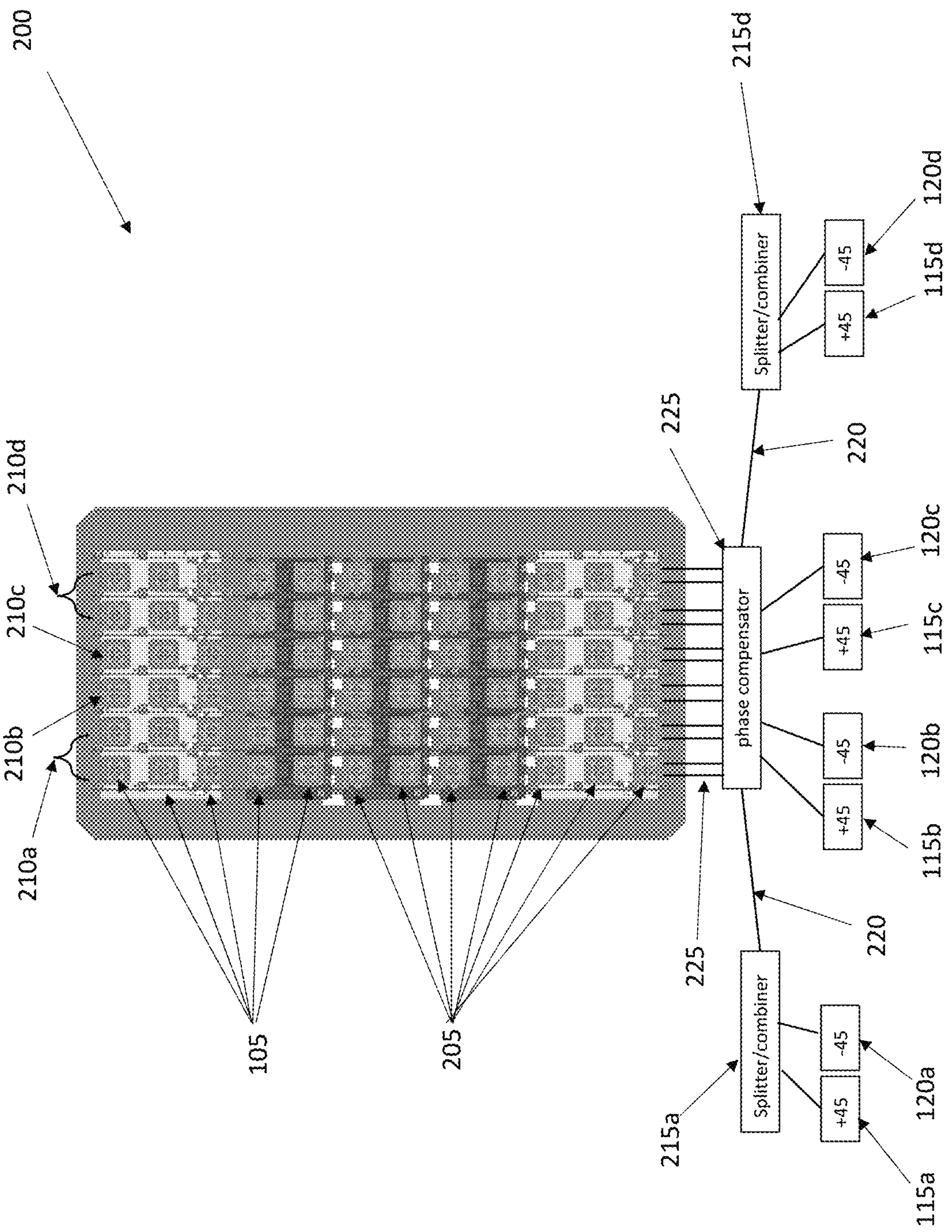
FIG. 2 illustrates an exemplary six-column 8T8R antenna array according to the disclosure.

FIG. 2 illustrates an exemplary six-column 8T8R antenna array 200 according to the disclosure. Antenna array 200 has a plurality of antenna elements 105 arranged in six columns whereby composite column 210*a* has two columns of antenna elements 105, as does composite column 210*d*. The remaining columns 210*b* and 210*c* each have a single column of antenna elements 105. Antenna elements 105 in antenna array 200 may be identical to those in conventional 8T8R antenna 100. Composite columns 210*a* and 210*b* each have two constituent columns.

Exemplary 8T8R array 200 has eight signal input ports: 115*a*/115*b*/115*c*/115*d* corresponding to the +45 degree polarized dipoles in antenna elements 105; and 120*a*/120*b*/120*c*/120*d* corresponding to the −45 degree polarized dipoles in antenna elements 105. As mentioned above, composite column 210*a* has two adjacent columns of antenna elements 105, which are fed RF signals via ports 115*a*/120*a*. Accordingly, the two columns within composite column 210*a* are fed identical copies of RF signals from ports 115*a*/120*a*. This is enabled by splitter/combiner 215*a*, which splits each of the downlink RF signals from ports 115*a*/120*a* into two identical downlink signals, one per column within composite column 210*a*. Splitter/combiner 215*a* also combines the signals received by each of the two columns of antenna elements 105 of composite column 210*a* into a single set of RF signals that are output through ports 115*a*/120*a* to the coupled radio remote unit (not shown). Similarly, composite column 210*d* has two columns of antenna elements 105, which are fed RF signals 115*d*/120*d*. Accordingly, the two columns within composite column 210*d* are fed identical copies of RF signals from 115*d*/120*d*. This is enabled by splitter combiner 215*d*, which splits the downlink RF signal from ports 115*d*/120*d* into two identical downlink signals, one per column within composite column 210*d*, and combines the RF signals received by the antenna elements 105 of each of the columns of composite column 210*d* into a single set of uplink signals that are output through ports 115*c*/120*d* to the coupled radio remote unit (not shown).

Another function of splitter/combiners 215*a* and 215*d* is to align the phases of spit/merged signals 115*a*/120*a* and 115*d*/120*d* so that they are phase matched for proper beamforming when the RF signals are transmitted/received by the two columns of composite columns 210*a* and 210*d*, respectively. An example of how this may be done is by equipping splitter/combiner 215*a/d* with a combination of power dividers and designing the lengths of the traces internal to splitter/combiner 215*a/d* to remove any path length discrepancies between ports 115*a*/120*a*/115*d*/120*d* and the respective columns within composite columns 210*a/d*. An example power divider is a Wilkinson power divider, although other power divider configurations are possible.

Exemplary 8T8R array 200 further has a phase compensator 225, which is coupled to the outputs 220 of splitter/combiners 215*a/d* and ports 115*b*/120*b* and 115*c*/120*c*, as well as to all of the columns 210*a/b/c/d*. The function of phase compensator 225 is to provide phase compensation of the outputs 220 of splitter/combiners 215*a/d* with the outputs of signal ports 115*b*/120*b* and 115*c*/120*c*. This is required because, unlike conventional 8T8R array 100 in which the signals from ports 115*a/b/c/d* and 120*a/b/c/d* are identical copies of the same respective RF signal (one per polarization), the signals from splitter/combiners 215*a/d* are sufficiently modified by splitter/combiners 215*a/d* that their signal output 220 needs phase compensation with the signals from ports 115*b*/120*b* and 115*c*/120*c* as well as the signals from the other splitter/combiner. Phase compensator 225 has a delay line (not shown) that imparts a delay to match the phases of the signals from ports 115*b*/120*b* and 115*c*/120*c* as well as match their phases to the signal outputs 220 from splitter combiners 215*a/d*. Thus by introducing delay lines on the middle ports 115*b*/120*b*/115*c*/120*c*, phase compensator 225 removes any path length discrepancies between ports 115*a*/120*a*/115*b*/120*b*/115*c*/120*c*/115*d*/120*d*.

An advantage of exemplary 8T8R array 200 is that with additional columns of antenna elements, antenna aperture is increased with the additional antenna elements, and the increased width of array 200 with the addition of two columns increases the array factor such that the gain of 8T8R array 200 increases with the narrowing of its beam in the azimuth plane compared to conventional 8T8R array 100. For example, as mentioned above, the gain of conventional 8T8R array 100 may typically be 20-21 dBi, whereas the gain of exemplary 8T8R array 200 may be 22.8 dBi.

Figure 3:
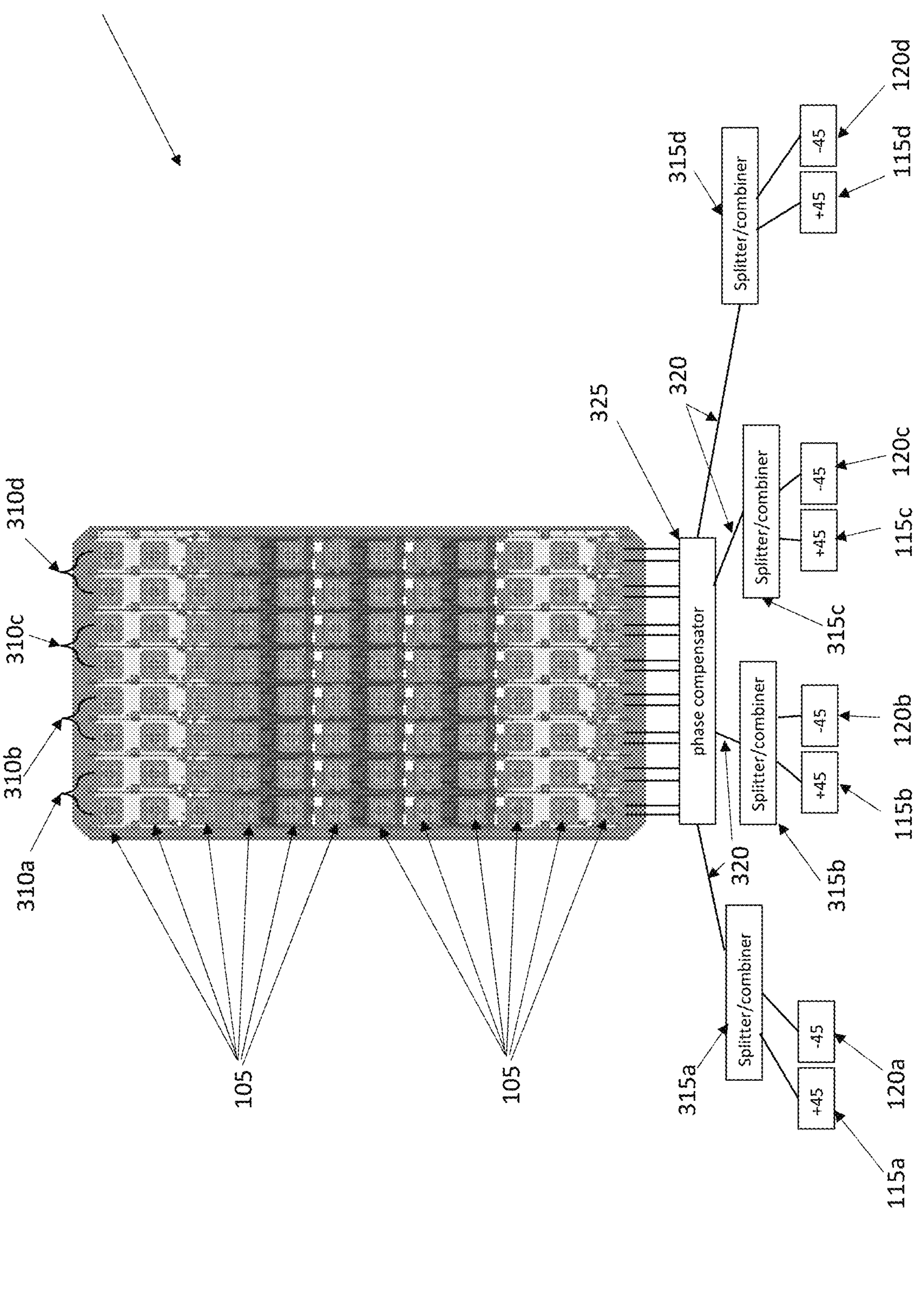
FIG. 3 illustrates an exemplary eight-column 8T8R antenna array according to the disclosure.

FIG. 3 illustrates an exemplary eight-column 8T8R antenna array 300 according to the disclosure. Antenna array 300 has eight columns of antenna elements 105, arranged in pairs of columns that make up four composite columns 310*a*, 310*b*, 310*c*, and 310*d*. Accordingly, composite columns 310*a/b/c/d*, each have two constituent columns. Composite columns 310*a* and 310*d* may be the same as composite columns 210*a* and 210*d* of exemplary antenna array 200. Splitter/combiners 315*a* and 315*d* may be the same as respective splitter combiners 215*a* and 215*d* of antenna array 200. Along with the addition of two composite columns 310*b* and 310*c*, exemplary antenna array 300 has a splitter/combiner 315*b*, which is coupled to ports 115*b*/120*b*; and splitter combiner 315*c*, which is coupled to ports 115*c*/120*c*. Splitter/combiners 315*b/c* may be similar to splitter combiners 315*a/d*, with the exception that the particular phase compensation mechanisms might be distinct for each of splitter/combiners 315*a/b/c/d* to account for differences in phase biases introduced in the cabling and circuitry for the eight columns making up composite columns 310*a/b/c/d* of antenna array 300.

Exemplary 8T8R array 300 has a phase compensator 325, which may be similar to phase compensator 225 of antenna array 200, with a difference in that phase compensator 325 is coupled to outputs 320 of four splitter/combiners 315*a*/

*b/c/d* and is not directly coupled to any of the ports 115*b*/120*b*/115*c*/120*c*, as is the case with antenna array 200.

An advantage of exemplary 8T8R antenna array 300 is that the addition of two columns—thus creating four composite columns 310*a/b/c/d*—expands the aperture of antenna array 300. Each port 115*a*/115*b*/115*c*/115*d* and 120*a*/120*b*/120*c*/120*d* is coupled to two columns of respective composite columns 310*a*, 310*b*, 310*c*, and 310*d*. The resulting additional array factor provides the narrow beamwidth for each of the RF signals from ports 115*a*/115*b*/115*c*/115*d* and 120*a*/120*b*/120*c*/120*d*. This expanded array factor increases the gain and narrows the azimuth beamwidth such that the gain of exemplary antenna array 300 may be as high as 23.8 dBi.

Figure 4:
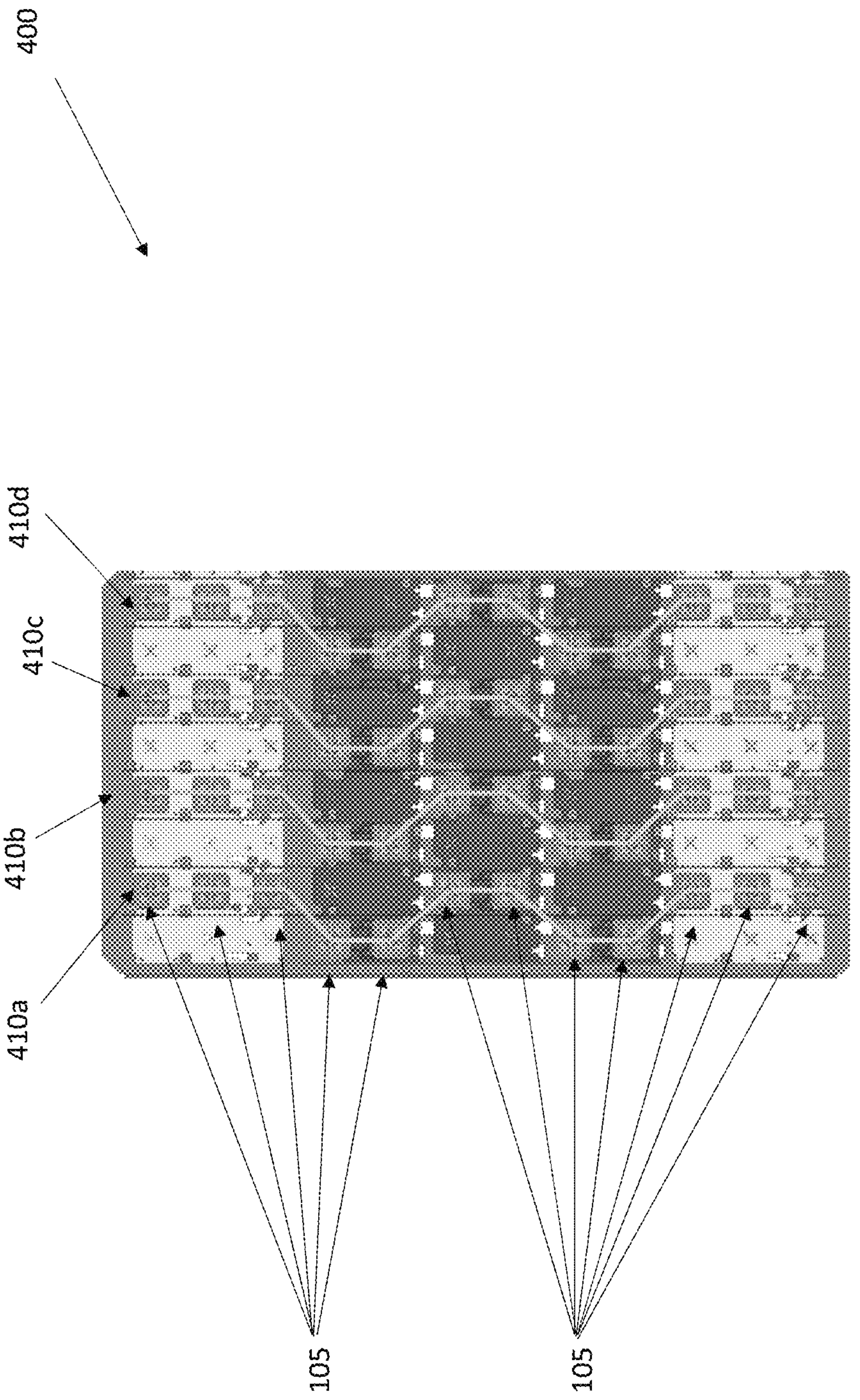
FIG. 4 illustrates an alternate exemplary embodiment array in which antenna elements are arranged in staggered columns.

FIG. 4 illustrates an alternate exemplary 8T8R antenna array 400 in which antenna elements are arranged in staggered columns 410*a*, 410*b*, 410*c*, and 410*d*, each having a plurality of antenna elements 105. Antenna array 400, as illustrated, offers an advantage over conventional 8T8R array 100 in that the alternating displacement of antenna elements 105 along column 410*a/b/c/d* in the azimuth direction provides an enhanced array factor, thereby increasing the gain of antenna 400 and decreasing the beamwidth.

Figure 5:
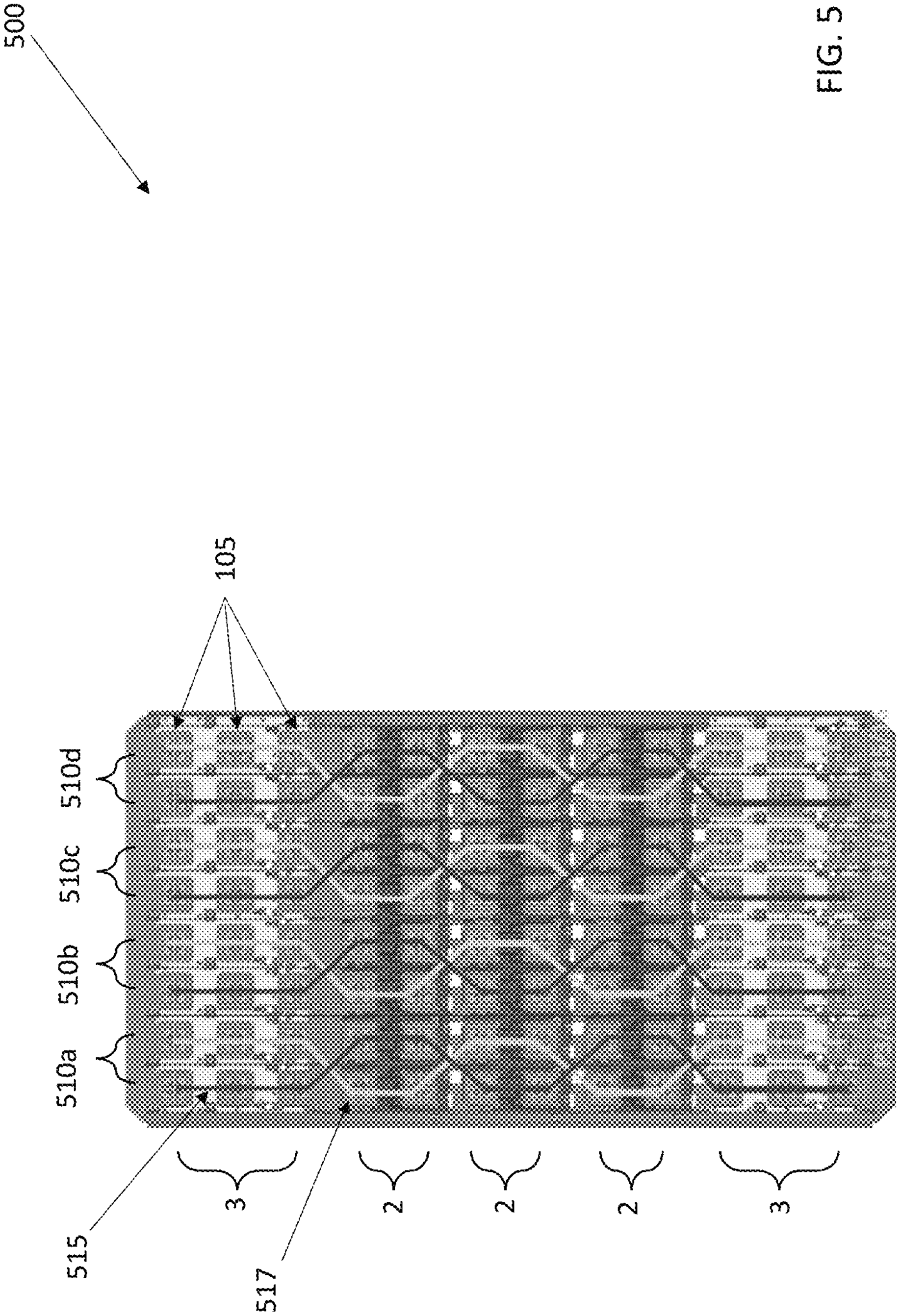
FIG. 5 illustrates an alternate exemplary embodiment with interwoven staggered columns of antenna elements.

FIG. 5 illustrates another exemplary antenna array 500, which has four interwoven column pairs 510*a-d*, each of which has a first constituent column 515 and a second constituent column 517. For each column pair 510*a-d*, first constituent column 515 constitutes three antenna elements 105 in a leftward sub-column and then switches to a rightward column for two antenna elements 105, and back as illustrated. Accordingly, each constituent column 515 and 517 has three vertically aligned antenna elements 105 at the top and bottom of array 500, and three consecutive alternating sets of two vertically aligned antenna elements 105. Accordingly, the first constituent column has a top segment having a first number of antenna elements 105 disposed in a first sub-column position; one or more intermediate segments having a second number of antenna elements, wherein the one or more intermediate segments are disposed in alternating first and second sub-column positions; and a bottom segment having a third number of antenna elements disposed in the first sub-column position. In exemplary antenna array 500, the first number of antenna elements 105 may equal three, the second number of antenna elements may equal two, and the third number of antenna elements 105 may equal three. It will be apparent from FIG. 5 that the second constituent column 517 has a configuration that mirrors the above-described configuration of first constituent column 515.

Having more elements (three, in this example) in a given constituent column at the top and bottom of antenna array 500 provides for better beam control in the vertical direction, providing for a narrower and more directive beam. In this variation, there would be eight columns in total, which may be high gain 16T/16R that is the expansion of high gain 8T8R. Accordingly, each first constituent column 515 and second constituent column 517 may be coupled to two corresponding ports, one per polarization. And each first constituent column 515 and second constituent column 517 having an improved gain due to the array factor provided by the interweaving pattern.

Although not shown in FIG. 5, antenna array 500 may have the same configuration of splitter/combiners 315*a*, 315*b*, 315*c*, 315*d* and phase compensator 325 as present in exemplary antenna array 300. It will be understood that such variations are possible and within the scope of the disclosure.

Additional variations of the disclosed antenna arrays are possible. For example, a variation of antenna array 200 may have composite columns formed of the inner four columns of antenna elements. In this variation, columns 210*a* and 210*d* may have a single column, column 210*b* may be a composite having two adjacent columns and column 210*c* may be a composite having two adjacent columns between composite column 210*b* and column 210*d*. Further, although exemplary antenna arrays 200 and 300 have six and eight columns respectively, it will be understood that each of these arrays may have more columns such that the composite columns may have more than two columns, or a combination of numbers of columns. It will be understood that such variations are possible and within the scope of the disclosure.

What is claimed is:

1. An antenna, comprising:

a plurality of composite columns of antenna elements, wherein each of the composite columns of antenna elements has a plurality of constituent columns of antenna elements, wherein each of the plurality of composite columns comprises a first constituent column and a second constituent column, wherein the first constituent column and the second constituent column are interwoven;

a plurality of splitter/combiners, each corresponding to a composite column and coupled to the constituent columns of the corresponding composite column; and a phase compensator that is coupled to an output of each of the splitter/combiners and to each of the composite columns.

2. The antenna of claim 1, wherein each of the composite columns comprises an adjacent pair of constituent columns.

3. The antenna of claim 1, wherein the antenna comprises an 8T8R (eight transmit eight receive) antenna.

4. The antenna of claim 1, wherein each of the plurality of splitter/combiners comprises:

a power divider; and a delay line.

5. The antenna of claim 1, wherein the phase compensator comprises a plurality of delay lines.

6. The antenna of claim 1, wherein each of the antenna elements comprises:

a first dipole configured to radiate at a first polarization; and a second dipole configured to radiate at a second polarization.

7. The antenna of claim 1, wherein the plurality of composite columns comprises four composite columns.

8. The antenna of claim 1, wherein the first constituent column comprises:

a top segment having a first number of antenna elements in a first sub-column position;

one or more intermediate segments having a second number of antenna elements wherein the one or more intermediate segments are disposed in an alternating first and second sub-column positions; and a bottom segment having a third number antenna elements in the first sub-column position.

9. The antenna of claim 8, wherein the first number is equal to three, the second number is equal to two, and the third number is equal to three.

10. An antenna array having a plurality of composite columns of antenna elements, wherein each of the composite columns of antenna elements comprises a first constituent column and a second constituent column, the first constituent column comprising:

a top segment having a first number of antenna elements in a first sub-column position;

one or more intermediate segments having a second number of antenna elements wherein the one or more intermediate segments are disposed in an alternating first and second sub-column positions; and a bottom segment having a third number antenna elements in the first sub-column position.

11. The antenna array of claim 10, wherein the first number is equal to three, the second number is equal to two, and the third number is equal to three.

* * * * *